United States Patent
Orsi Mazzucchelli

(10) Patent No.: US 10,836,145 B2
(45) Date of Patent: Nov. 17, 2020

(54) SHEET OF THERMOPLASTIC POLYURETHANE OBTAINED BY BLOCK PROCESS

(71) Applicant: MAZZUCCHELLI 1849 S.P.A., Castiglione Olona VA (IT)

(72) Inventor: Davide Orsi Mazzucchelli, Castiglione Olona VA (IT)

(73) Assignee: MAZZUCCHELLI 1849 S.P.A., Castiglione Olona VA (IT)

( * ) Notice: Subject to any disclaimer, the term of this patent is extended or adjusted under 35 U.S.C. 154(b) by 354 days.

(21) Appl. No.: 15/561,210

(22) PCT Filed: Mar. 23, 2016

(86) PCT No.: PCT/IB2016/051657
§ 371 (c)(1),
(2) Date: Sep. 25, 2017

(87) PCT Pub. No.: WO2016/151516
PCT Pub. Date: Sep. 29, 2016

(65) Prior Publication Data
US 2018/0065344 A1    Mar. 8, 2018

(30) Foreign Application Priority Data
Mar. 24, 2015   (IT) .................. 102015902340162

(51) Int. Cl.
| | | |
|---|---|---|
| B32B 27/08 | (2006.01) | |
| C08L 75/06 | (2006.01) | |
| C08L 75/08 | (2006.01) | |
| B32B 27/34 | (2006.01) | |
| B32B 27/40 | (2006.01) | |
| B32B 1/00 | (2006.01) | |
| B29C 69/00 | (2006.01) | |
| B29D 12/02 | (2006.01) | |
| G02C 5/00 | (2006.01) | |

(52) U.S. Cl.
CPC ............ *B32B 27/08* (2013.01); *B29C 69/001* (2013.01); *B29D 12/02* (2013.01); *B32B 1/00* (2013.01); *B32B 27/34* (2013.01); *B32B 27/40* (2013.01); *C08L 75/06* (2013.01); *C08L 75/08* (2013.01); *B32B 2274/00* (2013.01); *B32B 2307/306* (2013.01); *B32B 2307/536* (2013.01); *B32B 2307/54* (2013.01); *B32B 2307/71* (2013.01); *B32B 2307/732* (2013.01); *B32B 2307/734* (2013.01); *B32B 2307/738* (2013.01); *B32B 2457/00* (2013.01); *B32B 2605/003* (2013.01); *G02C 5/008* (2013.01)

(58) Field of Classification Search
CPC ......... C08G 18/42; C08G 18/48; C08L 75/06; C08L 75/08; G02C 5/008; B29C 69/001; B29D 12/02; B32B 27/08; B32B 27/34; B32B 27/40; B32B 2274/00; B32B 2307/306; B32B 2307/536; B32B 2307/54; B32B 2307/71; B32B 2307/732; B32B 2307/734; B32B 2307/738; B32B 2457/00; B32B 2605/003

See application file for complete search history.

(56) References Cited

U.S. PATENT DOCUMENTS

| | | | | | |
|---|---|---|---|---|---|
| 5,374,704 A | * | 12/1994 | Muller | .................... | A61L 27/18 |
| | | | | | 528/66 |
| 5,656,713 A | * | 8/1997 | Sarpeshkar | ........ | C08G 18/4202 |
| | | | | | 528/58 |
| 2015/0355478 A1 | * | 12/2015 | Falken | .................. | G02C 5/001 |
| | | | | | 351/121 |

FOREIGN PATENT DOCUMENTS

| | | |
|---|---|---|
| EP | 1 331 247 A1 | 7/2003 |
| EP | 1 804 094 A1 | 7/2007 |

OTHER PUBLICATIONS

"Thermoplastic Polyurethane Elastomers (TPU)", May 1, 2012, XP055225057, Elastollan—Product Range, PU Solutions Elastogran, BASF, The Chemical Company.

International Search Report, dated Aug. 17, 2016, from corresponding PCT application.

* cited by examiner

*Primary Examiner* — Christopher M Rodd
(74) *Attorney, Agent, or Firm* — Nixon & Vanderhye

(57) ABSTRACT

A sheet of thermoplastic material and the manufacturing process thereof by block processing is disclosed, wherein the material is a thermoplastic polyurethane (TPU) based on aliphatic polyethers or aliphatic polyesters, without addition of process solvents and/or plasticisers.

8 Claims, 1 Drawing Sheet

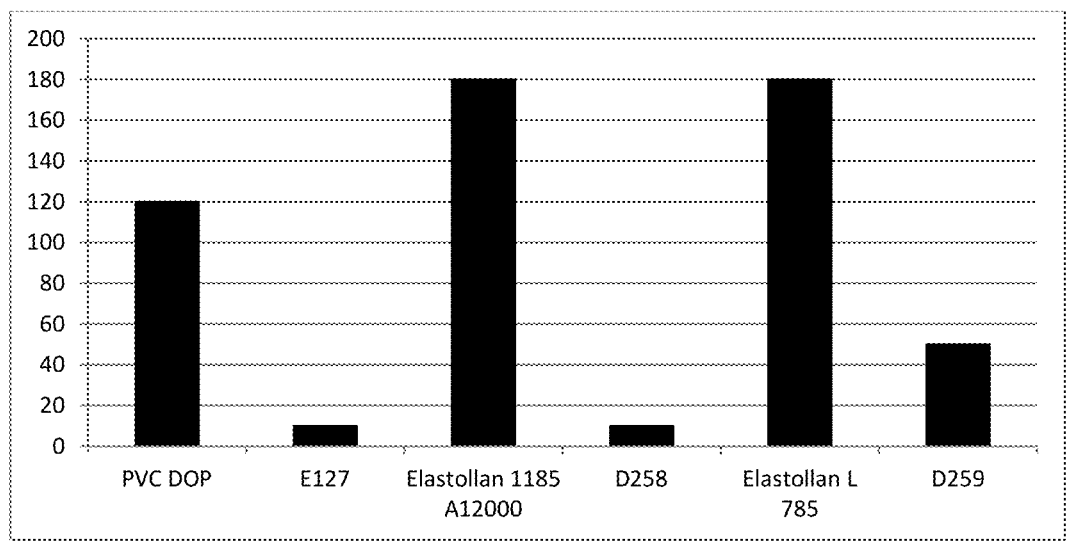

SHEET OF THERMOPLASTIC POLYURETHANE OBTAINED BY BLOCK PROCESS

FIELD OF THE INVENTION

The present invention relates to a sheet of thermoplastic material obtained by block process. In particular it relates to a sheet of thermoplastic polyurethane.

BACKGROUND ART

As known, plates/sheets of thermoplastic material are employed in various fashion sectors (accessories, costume jewellery, . . . ), footwear, furniture, automotive, sport (skis, snowboards, helmets), electronics (smartphones, tablets, PCs) and so on.

In some of these sectors the products are particularly appreciated when they are provided with original aesthetic aspects (patterns, nuances, colours . . . ). In particular, it is highly demanded that the aesthetic appearance of the thermoplastic material is not imparted only by surface colours, but that the pattern be embedded in the material, permeating the material in depth, so as to give an overlapping effect of the patterns and in any case a certain three-dimensional effect which gives bodiness, duration and "warmth" to the aesthetic appearance of the final product.

In order to obtain these effects, it is common practice to mix different-colour components through extrusion or block manufacturing processes. In the present specification only the second processing will be dealt with, which is the one which allows to obtain the best and most original results, in the face of technological peculiarities which make it difficult to be carried out.

In the block process commonly used, a thermoplastic polymer is mixed with plasticisers (10-40% by weight) and solvents (10-40% by weight) until obtaining a paste which is processed with calender rolls to obtain sheets of a specific colour. These sheets, which may also be reduced into strips, pieces or particulate of various sizes, are mutually assembled (mounted) within a formwork, then hot-pressed in order to obtain compact blocks. In particular, the formwork containing the mounted material is inserted into a press in which, due to pressure and heat, the compact block is formed through the melting of the various components together.

These blocks are subsequently cut to obtain plates/sheets of the desired thickness and of an aesthetic appearance given by the specific composition (mounting) which has been previously provided within the formwork.

These sheets can in turn be employed again for a subsequent mounting in the formwork, even multiple times.

Finally, the resulting plates/sheets are then dried and "matured" to remove the solvents.

The block process is described for example in the publication "1904-2004, 100 Years of Cellulose Diacetate, Review of Hundred Years Innovation History" published by Rhodia Acetow, pages 42-43.

The peculiarity of this block process, which implies multiple pressings and subsequent re-melting of the material (in some cases the material is molten up to 5 times), is extremely demanding for thermoplastic materials, which is why historically it has been typically used, at industrial/commercial level, for materials such as cellulose esters (acetate, nitrate, propionate and butyrate) and for PVC. Among cellulose esters, cellulose acetate (CA) is the most used.

However, for some applications in the above-mentioned commercial sectors the features of the plates/sheets of cellulose acetate or of PVC are not fully satisfactory. For example cellulose acetate is sometimes not suitable because it does not have sufficient dimensional stability or it is too rigid. Conversely, PVC has a little pleasant feeling to the touch.

Both these materials can furthermore be processed traditionally with the addition of plasticisers and, for cellulose acetate also solvents, which are considered essential in the block process but which imply a series of drawbacks.

Plasticisers tend to slowly migrate over time, impairing the features of the finished product. This phenomenon is particularly evident on the parts subject to high temperatures, such as in the automotive field, where the finished parts are often exposed to sunshine: this feature makes the final product incompatible with certain applications (for example, in the automotive industry plasticisers may generate a "fog" effect on the screen of the windscreen).

In PVC it often occurs that the released plasticiser generates an unpleasant oily patina on the sheet surface. Moreover the plasticisers most used for PVC are phtalates. The most common one has been for a long time the DOP (di-2-etylhexyl phtalate) which has been subsequently gradually replaced due to toxicological problems. Despite that, PVC has been remained associated with these toxicological problems, so much so that even today some manufacturers in the sectors linked to footwear and to fashion accessories, to electronic equipment and to household appliances no longer take PVC into consideration due to image problems.

Moreover, as mentioned, the block process with cellulose acetate requires the use of solvents, which are removed at the end with process expenses and safety problems.

As mentioned, temperature increase in the block process is essential, because it allows the thermoplastic material to reach the necessary viscosity for it to be processed and modified in its geometry. However, it is known that each thermal passage reduces the performances of the material, which is progressively inevitably degraded.

In cellulose acetate this problem has been overcome by the use of solvents which, on the one hand, allows processability thereof during the various steps of the block process, on the other hand it allows to melt the material at temperatures well below the characteristic melting point of the polymer, preserving the performances thereof even after various melting processes.

As mentioned above, in some cases it is necessary to melt the material various times (for example to obtain the so-called 'python effect' various mounting steps are required and 6 melting processes of the material), the opportunity of using the solvent hence becomes of fundamental importance. It is therefore possible to obtain highly sophisticated aesthetic effects with cellulose materials but it is a field precluded to PVC where the material cannot be molten more than twice, which significantly limits the aesthetic range thereof.

Partly also the plasticiser performs this function but, while the solvent is removed, the plasticiser remains within the sheet with the disadvantages which have been reported above.

There hence exists a strong interest by some market sectors in plates/sheets of thermoplastic material which have aesthetic characterisations typical of cellulose acetates, but without the technological limits reported above.

So far it has not been possible to identify a valid alternative. As a matter of fact, in order to be able to obtain the aesthetic appearances of interest, the thermoplastic material must have good processability and remain clear per se, despite the repeated processability and thermal treatments it undergoes in the block process.

Also other non-cellulose thermoplastic materials (polyamides, polyesters, polyurethanes and also polyvinyl compounds, . . . ) have already been assumed as replacements of conventional materials, always with the addition of significant amounts of plasticisers and solvents. However, they do not solve the problems related to solvents and so far they have not proven to be able to accept a technological process suited to obtain satisfactory aesthetic results.

The object of the present invention is hence that of selecting a thermoplastic material and a relative process by which to obtain sheets with aesthetic effects in depth in the material, comparable to those which can be obtained today with PVC and cellulose acetate, however, which is devoid of the drawbacks indicated above connected to the migration of plasticiser and to the removal of the solvents.

SUMMARY OF THE INVENTION

Such object is achieved through a sheet and relative manufacturing process as described in essential features in the attached claims.

In particular, according to a first aspect of the invention, a sheet of thermoplastic material is provided, obtained by block processing, wherein said material is a thermoplastic polyurethane (TPU) based on either aliphatic polyethers or aliphatic polyesters.

According to another aspect of the invention, a process for obtaining a sheet of thermoplastic material is provided, comprising the steps of producing a semi-processed product of thermoplastic polyurethane (TPU) based on aliphatic polyethers or aliphatic polyesters through an extrusion, moulding or melting process of particulate material, cooling down said semi-processed product to room temperature, reducing said semi-processed product into pieces of a desired shape and mounting said pieces in a formwork with a predefined scheme, causing said pieces in the formwork to undergo pressure and heat until melting, with a temperature in the range 110-200° C. and a pressure of 200-2000 KN/m$^2$, until obtaining an integral block;

cutting said integral block into a semi-processed product in the shape of sheets, possibly repeating steps c-e in succession multiple times.

According to another aspect, the sheets are subsequently cut and possibly thermoformed to obtain glasses frames, objects for costume jewellery, linings for constructions, linings for the automotive industry, linings for the electronics industry.

According to another aspect, a glasses frames is provided built starting from a sheet as above obtained through a process as indicated. Advantageously, the sheet is laminated sandwich-like with respective thin outer sheets made of nylon (PA).

BRIEF DESCRIPTION OF THE DRAWINGS

FIG. 1 illustrates the thermal behaviour of different polyurethanes vs time.

DETAILED DESCRIPTION OF PREFERRED EMBODIMENTS OF THE INVENTION

The Applicant, through wide testing and research activity, has identified a promising material in the family of thermoplastic polyurethanes (TPU) for reaching the objects set forth above. However, it was immediately evident that not all polyurethanes were capable of meeting the requirements necessary for being able to be block processed satisfactorily, supplying a product which is attractive on the market.

The Applicant, through wide testing, has verified that thermoplastic polyurethanes could be promising, because they do not strictly require the presence of specific plasticisers and solvents.

During the test it has been detected that, in the block process, TPUs, unlike what happens for cellulose esters for which this process was devised, can be processed without the need for any additive whatsoever. As a matter of fact, on an abstract level, it has been detected that TPUs are suitable to be reprocessed and laminated by simple heat input. However, precisely due to this feature, TPUs are not all processable without exception with a block process and especially—in the face of an acceptable processability—they are leaning towards being unsuitable from the point of view of the physical characteristics (colour, hardness, mechanical resistance, heat resistance, . . . ) thereof.

The variability of behaviour of TPUs has not made easy the research and development activity, for identifying and selecting the material and the process suitable to be able to obtain the desired results. As a matter of fact, a number of classes of TPUs exist, obtained starting from different monomers, with different chain structures, different chain lengths, different hardness degrees, with or without stabilisers against hydrolysis and UV rays.

It has now been found that, by using specific types of clear TPUs and by operating in suitable conditions, it is possible to obtain uniform semi-processed products of TPUs which can be used in a block process, hence undergoing pressure and heat to melt them multiple times in formworks and then cut obtaining even plates/sheets, of the desired thickness and provided with interesting aesthetic aspects.

As a matter of fact, the Applicant was able to identify that, among the various classes of TPUs, only TPUs based on aliphatic polyethers or aliphatic polyesters allow to obtain a sheet with satisfactory characteristics in the processing with block process. These two types of TPUs have been widely tested, also comparing them with other classes of materials, such as TPUs based on aromatic polyethers, aromatic polyesters with and without stabiliser for hydrolysis, with and without UV stabilisers.

In the case of the identified TPUs, it is preliminarily proceeded to obtain semi-processed products to start with, preferably through a traditional extrusion process (and also coextrusion); alternatively these semi-processed products can be obtained through injection moulding or compression and melting of particulate material (for example granules, flakes or other) in a mould.

The semi-processed products thus obtained are then suitably 'mounted' (that is, assembled by arranging pieces of material according to a preset pattern), after having possibly reduced them in size (dices, chips, strips, . . . ), within formworks and brought to melting at a temperature ranging between 110-200° C., depending on the TPU used, and to a pressure in the order of 200-2,000 KN/m$^2$. The duration of the melting cycle varies from 10 minutes to 36 hours, depending on the TPU used and on the dimensions of the block. In a process with industrial amount, typically process times are overall of about 20 hours including heating and cooling.

From the block thus obtained, once cooled, it is possible to obtain sheets by cutting with cutters known per se. By the term sheets, in the context of the present invention, it is meant to recomprise thin sheets with very small thicknesses, up to a few tenths of millimetre (for example below 1 mm up to 0.1 mm), up to sheets with more significant thicknesses of the order of a few millimetres (for example over 3 mm, up to 18 mm).

The sheets which can be obtained can make up a finished semi-processed product (to be meant for subsequent processing cycles in application industries) or be cut and reprocessed in a subsequent block process to obtain more complex aesthetic effects. The thermoplastic material selected by the Applicant is capable of properly withstanding multiple process cycles with repeated exposures to temperature rises.

The constant finding is that only the TPUs according to the invention, that is based on aliphatic polyethers and aliphatic polyesters, are able to provide products with all the required characteristics in terms of uniformity, clearness (both with small thicknesses, and with large thicknesses), possibility/evenness of cutting into sheets of desired and regular thickness, mechanical features, dimensional stability, resistance to aging, to temperature and to UV rays, possibility/ease of lamination with other thermoplastic materials.

The wide testing has identified different commercial products suited for the purpose and falling within the products according to the invention. For example, products according to the invention are Elastollan® L1185 A 12000 made by BASF (which is an aliphatic polyether, Shore 85 A) and Elastollan® L 785 A 10 000 made by BASF (aliphatic polyester, Shore 86 A).

Conversely, as a confirmation that the selection according to the invention is the only one to be satisfactory, various comparison tests have been carried out that have highlighted the inadequacy of other polyurethane materials such as an aromatic polyether Shore 78 D (comparison product E127), an aromatic polyester Shore 87 A (comparison product D258), an aromatic polyester without stabiliser for hydrolysis—Shore 90 A (comparison product D259).

The comparison has been extended also to cellulose acetate and PVC prepared in a conventional manner with a block process. The blocks obtained have undergone at the same characterisations of the blocks of polyurethane according to the methods indicated here in the following. As reference, it can be considered that the process conditions in this test have been the following.

The semi-processed material (obtained with the extrusion technique, among the various ones described above) has been mounted and formed in blocks of the dimensions of 17×36 centimetres, with a thickness up to 10 centimetres, using a press with a heating system, bringing the block to a temperature ranging between 130° C. and 180° C. (see table 1) and at a pressure of about 320 KN/m² for 3 hours. The mould has hence been cooled down to room temperature. On the TPU blocks obtained the following tests and assessments have been carried out:

Cutting. The blocks have been cut (with conventional cutters in the sector of sheets of cellulose acetate) in sheets of the thickness of 0.2 mm, 0.5 mm, 1 mm, then pressed to have a perfect plane. The cutting ease and cutting regularity have been assessed: the cut must occur without jerks and blade jumps so as to obtain a perfect sheet in which the same thickness is achieved in the various areas; the cut sheets must remain perfectly planar and not curl on themselves.

Uniformity. The resulting block has been visually assessed to verify the uniformity after melting and cutting and to determine if the sheet obtained was devoid of unevenness and unmelted areas.

Clearness. The clearness of the block after melting and after the cutting test has been visually assessed in order to verify the obtaining of a sheet provided with good clearness.

Hardness. Determination of the Shore hardness according to rule ISO 868.

Tensile resistance. Test carried out according to rule DIN 53504, with crossmember speed of 500 mm/min, cell load 10 KN, butterfly sample of 12.7 mm width, useful portion 10 mm and clamp distance 100 mm.

Dimensional stability. Samples measuring 15×15 cm and of 0.2 mm thickness have been prepared on which 4 points at the vertexes of a 10 cm-side square have been marked. The samples have been put into an oven at 110° C. for 5'. The percentage variation of the length of the square sides has been assessed.

Resistance to UV rays. The test has been carried out according to rule DIN 16519, using the test apparatus XENOTEST 1505 Heraeus, checking the samples which have undergone the test after 24 h-48 h-72 h and 96 h to verify the yellowing thereof by comparison with an original sample of the same material (which has not undergone UV radiation).

Thermal aging. This test has been carried out with a method typical for PVC; small sheets of 1.5 mm thickness have been prepared by compression in a laboratory press at 180° C. for 10 minutes with pressure of 40 atm. From each sheet, twelve sample sheets measuring 1.5 cm×1.5 cm have been obtained which are put into the oven at 180° C. and removed at intervals of 20-40-50-60-70-80-90-100-110-120-150 and 180 minutes: the degradation of the samples has then been visually observed (yellowing or browning) by comparison with an original sample of the same perfectly clear material.

Lamination with other polymers. Lamination ability with other polymers has been verified. A film of the thickness of 0.2 mm, obtained by cutting the block, has been put between two sheets of a desired sample polymer having a thickness of 0.5 mm: the sandwich thus obtained has been pressed in a laboratory press putting it between two shining chrome sheets at a temperature of 180° C. for 10 minutes at the pressure of 40 atm. Final sheets have been obtained having a thickness of about 1.2 mm with the film of TPU inside the sheets of the chosen polymer. The tests are carried out to verify how strong the lamination adhesion is, performing a series of bendings to verify that there are no delaminations and that the bonding resists perfectly. As an example lamination has been tested with: PC, CP, PMMA, ABS, PA.

The entire frame of the comparative test which has been carried out is reported in underlying Table 1. For the thermal aging and UV aging tests the assessment has taken as reference the behaviour of the PVC block and expressing the comparison by + (best behaviour), = (substantially same behaviour), − (worse behaviour).

TABLE 1

| Prova No | prodotto | risultato fusione - omogeneità | risultato al taglio | trasparenza | Durezza dichiarata Shore D | Durezza dichiarata Shore A | Durezza misurata ISO868 Shore D | Durezza misurata ISO868 Shore A | Trazione tipo PVC - DIN53504 carico Mpa | Trazione tipo PVC - DIN53504 % allungamento |
|---|---|---|---|---|---|---|---|---|---|---|
| | Acetato di cellulosa blocco | | perfetto | trasparente | – | – | 30 | 70 | 40 | 6 |
| | PVC | ok a 130° C. | perfetto | trasparente | – | – | 40 | 88 | 14 | 112 |
| 1 | ELASTOLLAN L1185 A 12000 | ok a 130° C. | perfetto | trasparente | – | 85 | 45 | 85 | 14 | 495 fine corsa |
| 2 | ELASTOLLAN L785 A 10000 | ok a 130° C. | perfetto | trasparente | – | 86 | 45 | 90 | | |
| 3 | E127 | ko | non tagliabile-duro | opalescente | – | 77 | – | 80 | | |
| 4 | D258 | ok a 130° C. | scarso | leggermente opalescente | 33 | 87 | 45 | 89 | | |
| 5 | D259 | ok a 165° C. | difficoltoso | trasparente | – | 92 | 50 | 90 | | |

| Prova No | Stabilità dimensionale % | invecchiamento UV | invecchiamento metodo PVC | Commenti | Laminazione con PC | CP | PMMA | ABS | PA | idoneo |
|---|---|---|---|---|---|---|---|---|---|---|
| | –0.6 0 | = 96 h OK | | | ok utilizzando hot-melt | | | | | |
| 1 | 0 | = | + + | ritorno dopo snervamento a prova trazione | ok | ok | ok | ok | ok | SI |
| 2 | | = | + + | | ok | ok | ok | ok | ok | SI |
| 3 | | --- ingiallisce dopo 24 h | – – – | | non testato | | | | | no |
| 4 | | --- ingiallisce dopo 24 h | – – – | | non testato | | | | | no |
| 5 | | --- ingiallisce dopo 24 h | – | | ok | | | | | no |

In FIG. 1, on the y-axis the time in minutes is reported, on the axis of abscissae the type of tested product. The bars indicate the time at which the sample shows such a yellowing as to make the product not usable.

As can be evinced from the reported comparison, the TPUs according to the invention, that is the TPUs based on aliphatic polyethers and aliphatic polyesters, have confirmed to be the only ones capable of providing the desired optimal performances.

This material according to the invention has proved advantageous from various points of view. Firstly, being devoid of plasticisers and solvents, it is not weighed down by the solvent migration and management problems which instead imply some problem in the known-art thermoplastic materials. More in particular, the advantages of the sheets according to the invention with respect to the known sheets of cellulose materials are:

extremely limited process times, because the material does not require weeks long 'maturing' step for solvent removal;

absence of migration phenomena, since there is no plasticiser;

dimensional stability;

opportunity for more extreme forming;

greater ease to bond/laminate the sheet to other materials: cellulose acetate due to the used plasticisers cannot always be easily coupled with or bonded to other materials. The advantages instead over PVC sheets are:

absence of migration or toxicity phenomena, since there is no plasticiser (in particular the phtalates widely used with PVC);

greater ease of lamination; as a matter of fact, in order to be laminated to some polymers, PVC requires films which increase the adhesion thereof; vice versa the sheets according to the invention can be laminated with the sole help of pressure and heat.

Moreover, these sheets of TPU can be favourably laminated/coupled to another polymer (sandwich-like: polymer/TPU/polymer or laminate: polymer/TPU), obtaining a laminate with physical/mechanical performances typical of the polymer used for lamination (hence with the opportunity to improve some performances, such as impact or shot resistance) and with the aesthetic aspects typical of a material obtained with a block process, such as the TPU sheet. It is furthermore possible to treat the 'laminating' polymer with coating and surface treatments which guarantee further performances to the polymer. We point out, for example, not limited to, anti-scratch coating, demisting etc. Polymers which have proven suitable to be used for the coupling/lamination with sheets of TPU according to the invention are, without it to be meant as limiting: polyamide 6 (PA), polyamide 11 (PA), polyamide 12 (PA), polyethylene (PE), polycarbonate (PC), ABS (acrylnytril butadien styrene), SAN (styrene-acryl-nytril), ASA (acrylonytrile-styrene-acrylate), PC/ABS (blend of polycarbonate and acrylonytrile butadien-styrene), PVC, PMMA (poly-methyl-methacrylate), PBT (polybutyleneterephtalate), PBT/ASA, ASA/PC, cellulose esters (for example CP=cellulose propionate).

It has furthermore been detected that a plasma treatment, for some materials can improve adhesion: for example in the case of polyamide 6.6, PBT, PS, PP.

By laminating sheets of TPU according to the invention with PA (Nylon), particularly advantageous sheets can be obtained in the application in glasses frames having a high aesthetic value (imparted to the laminate by the TPU machined from block) and performance value (imparted to the laminate by the PA). The sheet obtained by lamination can be processed by glasses-manufacturing companies with known and characteristic conditions of the Nylon, including the polishing step by tumble finishing. In addition to the already mentioned advantage about the known processability of the laminate (due to the fact that nylon is a polymer known to glasses manufacturers), a further advantage exists: the use of a laminate (sandwich) of PA/TPU/PA enables glasses manufacturers to obtain a product which combines hugging shapes or more extreme thermoforming with aesthetic effects and depth effects of the same. In these cases, the final laminate sheets are of a thickness typical of the classic thicknesses for obtaining a glasses frame. For example, starting from a thickness of the material according to the invention of 0.2 mm, in order to obtain a front frame of the thickness of about 8 mm one can use a top PA layer of 3 mm and a base PA layer of 5 mm with the layer of material according to the invention lying in between; in order to obtain a temple bar of a pair of glasses of about 4 mm, one can have a PA top of 0.5 mm, a lamina of the TPU according to the invention of 0.2 mm and a PA base of 3.5 mm.

This configuration according to the invention allows to overcome the limits of known-art nylon glasses frames, which can be single-colour or at most enriched by spraying or painting, or those of cellulose acetate frames which, although having highly appreciated aesthetic connotations, do not allow to obtain wrapping shapes.

The lamination opportunity of the material according to the invention with polymer materials having high mechanical characteristics, such as nylon (which operation was not possible with the known-art materials such as cellulose acetate), allows to impart excellent mechanical characteristics to the semi-processed material. Therefore the resulting laminated material can have a much smaller overall thickness with respect to the one which can be obtained, the mechanical characteristics remaining the same, with the known-art materials which allowed to obtain similar aesthetic effects. A glasses frame can hence be built with smaller thicknesses, which allows to explore also new aesthetic solutions.

Due to the excellent adhesion to a wide variety of substrates, the sheets according to the invention can be used also for overmoulding processes, using as base the same polymers already mentioned above for lamination. The sheets according to the invention can also undergo embossing, to obtain special surface effects, appreciated in the already mentioned application sectors (for example for the manufacture of belts and armbands for watches).

Finally, it has been detected that the TPU sheets obtained with the block process according to the invention are tear-resistant and resistant to abrasion: they can hence be used as lining material and, in suitable hardness degrees, they can replace natural-origin materials such as the hides and skins used both in saddlery and in fashion accessories (footwear, bags, etc.). However, it is understood that the invention is not limited to the special embodiments illustrated above, which make up only non-limiting examples of the scope of the invention, but that a number of variants are possible, all within the reach of a skilled person in the field, without departing from the scope of the invention.

The invention claimed is:

1. A process for obtaining a sheet of thermoplastic material, the method comprising steps of
   a. producing a semi-processed product of thermoplastic polyurethane (TPU) based on aliphatic polyethers or aliphatic polyesters by an extrusion or moulding or melting process of particulate material, without addition of process solvents and/or plasticisers,
   b. cooling down to room temperature said semi-processed product,
   c. reducing into pieces of the desired shape said semi-processed product and mounting with a predefined scheme said pieces in a formwork,
   d. causing said pieces in the formwork to undergo pressure and heat until melting, with a temperature in the range 110-200° C. and a pressure of 200-2000 KN/m$^2$, until obtaining an integral block; and
   e. cutting said integral block into a semi-processed product in the shape of sheets.

2. The process of claim 1, wherein said sheets are subsequently cut and optionally thermoformed to obtain glasses frames, or costume jewelry objects, linings for buildings, linings for the automotive industry or linings for the electronics industry.

3. Glasses frames comprising a sheet of thermoplastic material obtained by the process according to claim 1, wherein said material is a thermoplastic polyurethane (TPU) based on aliphatic polyethers or aliphatic polyesters without addition of process solvents and/or plasticisers.

4. The glasses frames as in claim 3, wherein said sheet is laminated with one or more thin external nylon sheets (PA).

5. The method of claim 1, wherein steps c through e are repeated.

6. The method of claim 5, wherein steps c through e are repeated multiple times.

7. Glasses frames comprising a sheet of thermoplastic material obtained using the process of claim 5.

8. Glasses frames comprising a sheet of thermoplastic material obtained using the process of claim 6.

* * * * *